United States Patent [19]
Harte

[11] Patent Number: 5,794,137
[45] Date of Patent: Aug. 11, 1998

[54] METHOD FOR INCREASING STAND-BY TIME IN PORTABLE RADIOTELEPHONES

[75] Inventor: Lawrence Harte, Fuquay-Varina, N.C.

[73] Assignee: Ericsson Inc., Research Triangle Park, N.C.

[21] Appl. No.: 503,321

[22] Filed: Jul. 17, 1995

[51] Int. Cl.$^6$ .................................................. H04B 1/16
[52] U.S. Cl. ........................ 455/343; 455/38.3; 455/574
[58] Field of Search ........................... 455/38.2, 38.3, 455/54.1, 70, 343, 517, 574, 127

[56] References Cited

U.S. PATENT DOCUMENTS

| | | |
|---|---|---|
| 4,479,125 | 10/1984 | Mori . |
| 4,852,148 | 7/1989 | Shibata et al. . |
| 4,996,526 | 2/1991 | DeLuca . |
| 5,001,471 | 3/1991 | Snowden et al. . |
| 5,048,059 | 9/1991 | Dent . |
| 5,224,152 | 6/1993 | Harte . |
| 5,471,655 | 11/1995 | Kivari .................. 455/343 X |

FOREIGN PATENT DOCUMENTS

| | | |
|---|---|---|
| 0319219 | 6/1989 | European Pat. Off. . |
| 0 361 350 A2 | 4/1990 | European Pat. Off. . |
| 0 473 465 A1 | 3/1992 | European Pat. Off. . |
| 0 656 693 A2 | 6/1995 | European Pat. Off. . |
| WO 90/10987 | 9/1990 | WIPO . |

*Primary Examiner*—Chi H. Pham
*Attorney, Agent, or Firm*—Burns, Doane, Swecker & Mathis, L.L.P.

[57] ABSTRACT

Reduced current drain is effected by cycling off non-essential circuits within the radiotelephone during periods of inactivity. The period of inactivity is dynamically allocated using data update messages sent over the analog control channel. Each data update message consists of an update index and a data message. The mobile radiotelephone receives the update index to determine if there has been any change to the data message. If there has been no change to the message, the mobile radiotelephone turns off non-essential circuits during the duration of the data message. In this manner, the mobile radiotelephone may be quiescent for as long as the data message, e.g., 20 words, or 950 milliseconds of each full second. This corresponds to a 5% duty cycle. The duration of the quiescent period allows components with a slow response time, such as the frequency synthesizer, to be deactivated further reducing battery drain. The length of the data message may also be dynamically changed to optimize stand-by time relative to paging activity.

13 Claims, 3 Drawing Sheets

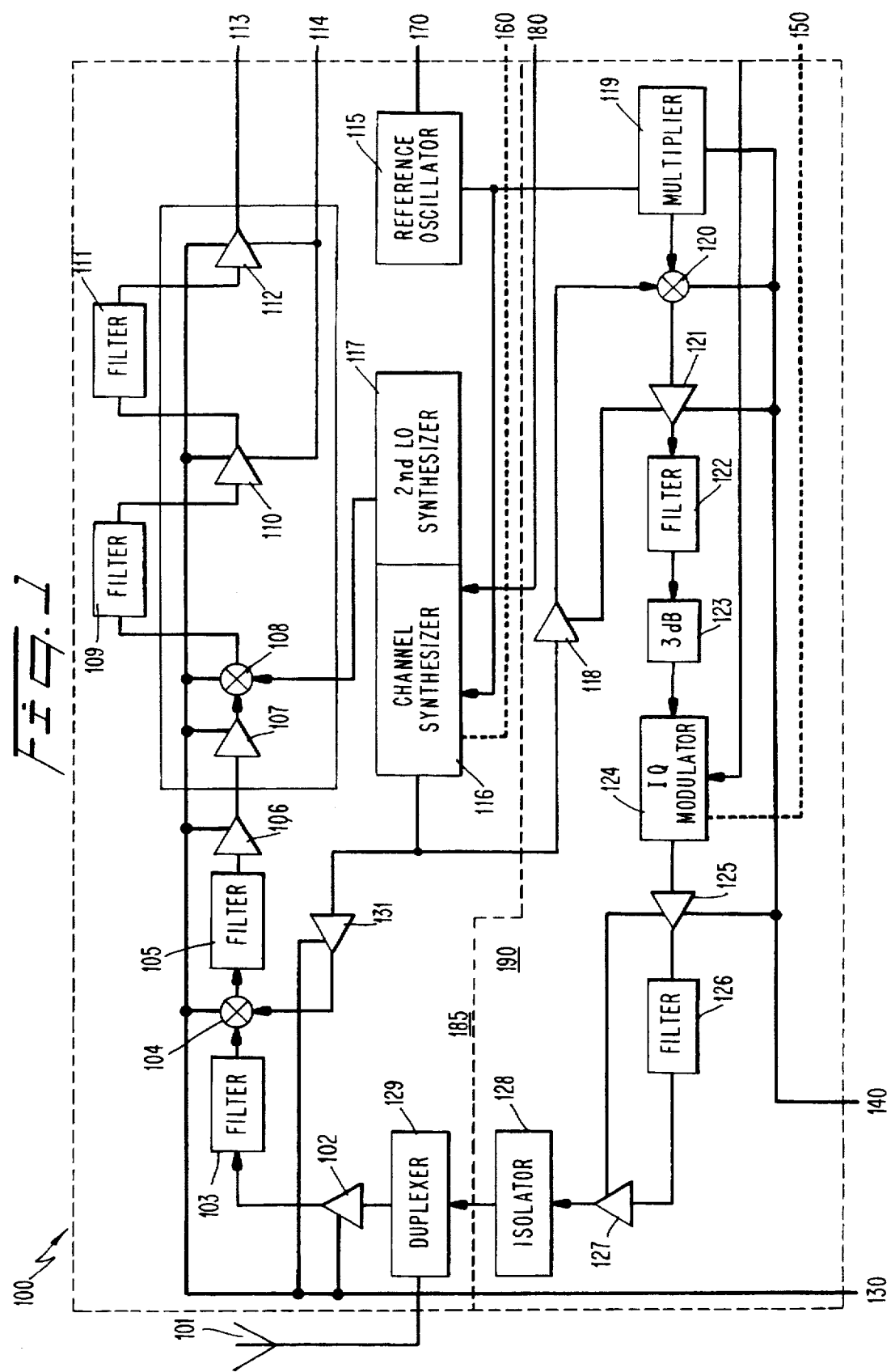

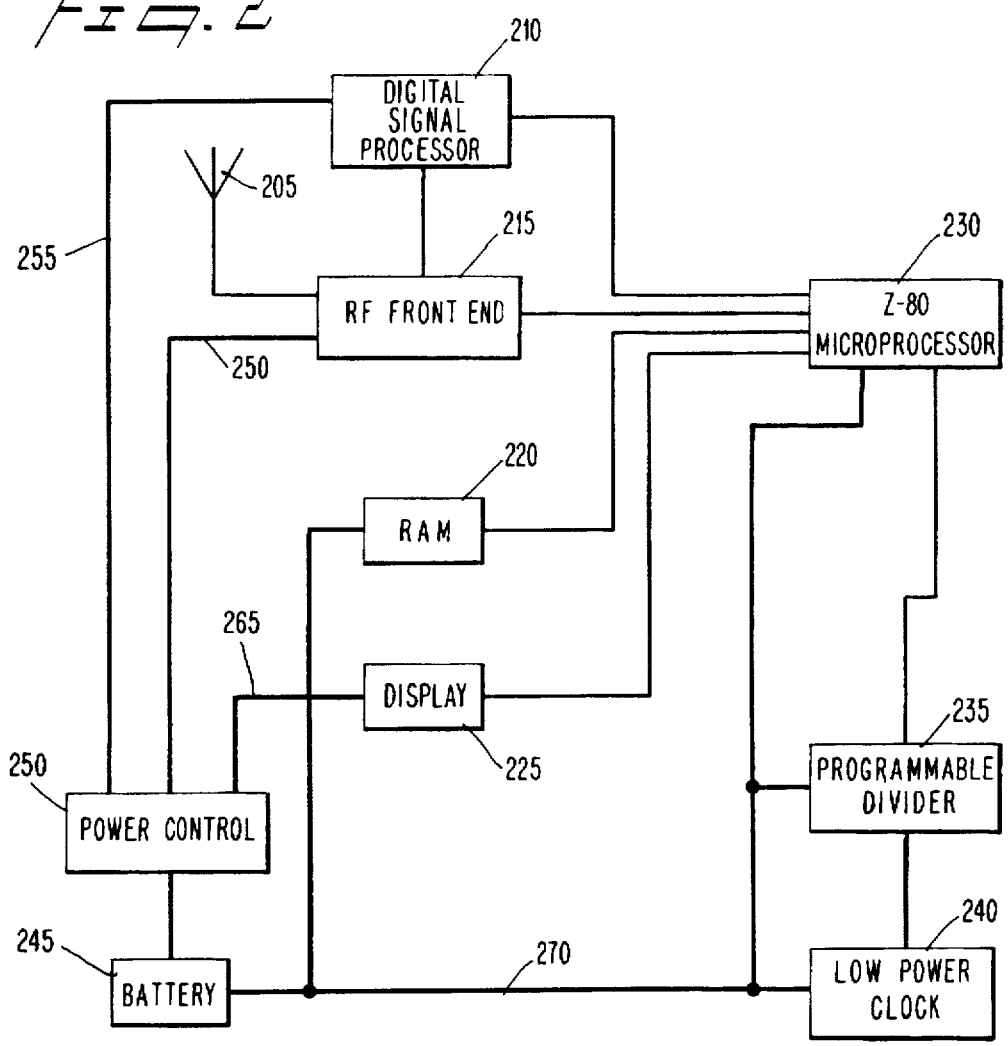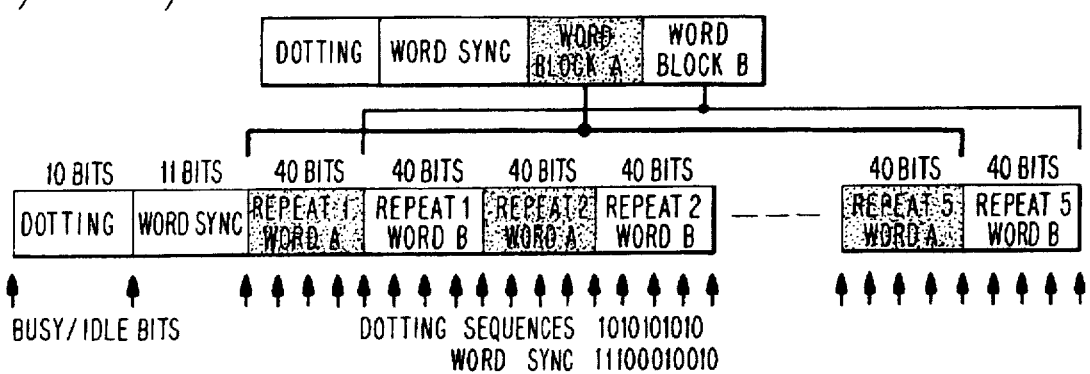

1

METHOD FOR INCREASING STAND-BY TIME IN PORTABLE RADIOTELEPHONES

BACKGROUND OF INVENTION

1) Field of the Invention

The present invention relates to a battery operated transceiver circuit including a power savings method and apparatus to prolong battery life.

2) Discussion of Related Art

Various methods have been presented to enhance the stand-by time of portable radio receivers. These generally involve cycling on and off certain circuits of the device in response to varying stimuli. As illustrated by the following descriptions, most of these techniques apply to the peculiarities of radio pagers and as such do not offer equivalent application to portable radiotelephones.

U.S. Pat. No. 4,479,125 to Mori describes a radio paging receiver wherein the normal battery saving cycle of intermittently removing power to non-essential circuits during the absence of paging signals may be suspended. Upon the successful receipt of a predetermined preamble code the battery saving operation is temporarily halted for test and alignment purposes. At other times, power is intermittently supplied to the receiving circuit in a prescribed cycle. Intended to provide convenient means for service operations, the Mori patent does not significantly enhance the stand-by time of the radiopager during normal operation.

European Patent Application 88311228.6 to Marai et al. describes also a radio paging receiver with cyclical application of battery power to various non-essential circuits. Radio pages are sent to predetermined groups of radio pagers and are often repeated several times. Upon receipt of a predetermined preamble code sent as part of the paging signal there is indicated an absence of paging signals during which time the battery savings mode may be selected. The duration of this period may extend over both the remaining words in the paging group and over any repeated messages.

U.S. Pat. No. 4,852,148 to Shibata et al. describes a method for autonomous registration in a radio telephone system whereby power savings may be effected. The power savings is achieved by cycling on and off certain circuits within the radiotelephone. In this method the radio telephone cycles on to receive pages within one predetermined time slot of four announcements sent from a base station. Included within the announcement is the identification number of the base station. When the radiotelephone has been registered with a certain base station (or zone), it stores the ID number of that station in RAM. If the radiotelephone receives an announcement whose ID number does not coincide with that stored in RAM, the radiotelephone exits the battery savings mode. Once out of the battery savings mode the receiver circuits within the radiotelephone remain on for a period of time exceeding the announcement duration of the base station. During this time the radiotelephone receives a new identification number and then transmits, randomly, a position entry request. Upon receipt of entry confirmation, the radiotelephone re-enters the battery savings mode until a new ID number is received.

U.S. Pat. No. 4,996,526 to DeLuca describes a battery savings technique used with POCSAG (Post Office Code Standardization Advisory Group) signaling wherein the radio pager enters a battery savings mode whenever there is disagreement of a number of bits between a predetermined code and the received signal, thereby allowing battery savings during the remainder of the signal. This prevents the radio pager from receiving the complete address of a signal not intended for it.

U.S. Pat. No. 5,001,471 to Snowden et al. describes a radio paging system wherein information messages may be simultaneously received by a plurality of pagers. The receiver section is activated periodically. A radio receiver receives an indication as to whether a message is going to be sent and what frame the message will appear. Radio pagers authorized to receive such global messages are instructed by a base station to receive a predetermined frame wherein the message is contained. The radio pagers may also receive individual messages by searching other frames of the transmitted signal. The receiver section is not activated at times other than the predetermined time interval and the frame(s) in which global or individual messages appear.

As evidenced by the aforementioned prior art techniques, there are many ways to enhance the battery life of radiopagers. Although these and other techniques may be exploited to extend the battery life in radiopagers they are not well-suited to the peculiarities of portable radiotelephones. The autonomous registration method described by Shibata et al. enhances stand-by time but still requires the portable radiotelephone to receive unnecessary messages thereby wasting precious battery energy.

SUMMARY OF THE INVENTION

It is therefore an object of the present invention to provide an improved battery savings technique that substantially increases the stand-by time of portable radiotelephones while preserving the air interface standards currently in use with portable radiotelephones. It is a further object of the present invention to dynamically allocate the duty cycle of certain circuits within the portable radiotelephone to optimize paging response time as well as battery life. It is yet another object of the present invention to provide for a deep-sleep mode whereby even slowly responding devices, such as the frequency synthesizer, may be deactivated. These and other objects and advantages of the present invention will be made obvious from the following description of the preferred embodiment.

BRIEF DESCRIPTION OF THE DRAWINGS

The invention will now be described by way of exemplary embodiments in conjunction with the accompanying drawings, in which, FIG. 1 is an illustration of a portion of an exemplary RF circuit used as part of the battery saving architecture in accordance with the present invention;

FIG. 2 is an illustration of exemplary circuits within a portable radiotelephone in accordance with the present invention;

FIG. 3 is an illustration of an exemplary data message format for the forward analog control channel as specified by the EIA/TIA standards for NAMPS/TDMA/CDMA such as recommended standards EIA-553, IS-54B, and IS-136 for cellular communications;

DETAILED DESCRIPTION OF PREFERRED EMBODIMENTS

Figure 4:
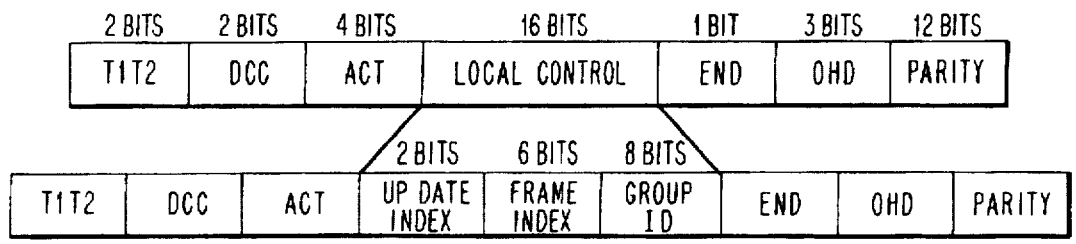
FIG. 4 is an illustration of exemplary local control data elements in accordance with the present invention.

The present invention is based in part on the recognition that a grouping of paging messages and long delays are not necessarily disadvantages. There are some components of a mobile station, such as the frequency synthesizer, that require relatively long periods of inactivity in order to be efficiently deactivated and then reactivated. Therefore even when operating at low duty cycles, the prior art solutions do not allow mobile stations sufficient time to deactivate such circuits. In order to maximize battery savings, these power consuming devices should be periodically deactivated.

Hardware

FIG. 1 illustrates a RF front-end circuit 100 of the present invention. Included in the RF circuit 100 are both transmit 190 and receive 185 circuits. During stand-by, there is usually no requirement to transmit signals and therefore transmit circuits 190 may be deactivated by removing power from a first power control bus 140. As can be seen in FIG. 1, the first bus 140 supplies power to the major elements of the transmit circuit 190. These elements include a multiplier 119, which receives and generates various multiples of a reference frequency supplied by a reference frequency oscillator 115. The output of the multiplier 119 supplies a signal which is combined in an adder circuit 120 with the output of a channel synthesizer 116. The combined signal is then amplified in a first amplifier 121, filtered in a first filter 122, attenuated by 3 dB in an attenuator 123 to effectively suppress signal reflection, and modulated in an IQ modulator 124 to provide the proper signal format. The IQ modulator, being a relatively slow response component, is selectively deactivated by a third power control bus 150.

The modulated signal is then amplified in a second amplifier 125, filtered in a second filter 126, and amplified in a third amplifier 127. Thereafter, the signal is conditioned in an isolator 128 before entering a duplexer 129 for ultimate transmission through an antenna 101.

As can be seen from FIG. 1 the major power consuming components of the first through third amplifiers 121, 125 and 127, the adder 120 and the multiplier 119 are selectively disconnected from a power supply by control of the first power supply bus 140. During standby mode this first power supply bus 140 is selectively controlled, as explained below.

Since the radiotelephone may receive pages during standby mode, the receiver circuits 185 are required to be periodically activated. The receiver components connected to a second power bus 130 are considered to be 'instant-on' devices. That is, these devices usually stabilize within tens of nanoseconds after power is applied to them. As a result these devices may be cycled on an off rapidly without loss of received signal information. Therefore during short sleep intervals, a so-called nap mode may be invoked whereby the power is removed from the second bus 130.

These instant-on devices include a fifth amplifier 102, which receives and amplifies a signal from the duplexer 129. The amplified signal is then filtered in a third filter 103 and mixed in a second mixer 104 with a selected frequency to form an intermediate frequency, the selected frequency having been amplified in a sixth amplifier 131 and generated in the channel synthesizer 116. The frequency output from the channel synthesizer 116 is selected by a control signal on a signal line 180, which is generated by circuitry (not shown) which controls access requests and handoff and monitoring procedures. The reference oscillator 115 supplies the channel synthesizer 116 with a reference frequency. The power for the second mixer 104 and the sixth amplifier 131 is supplied by the second bus 130.

The mixed signal is then filtered in a fourth filter 105, amplified in a seventh amplifier 106 and input as an intermediate frequency to a log-polar signal processing circuit, as described in U.S. Pat. No. 5,048,059 to Dent. The log-polar signal processing circuit consists of three serial log-amp stages consisting of amplifiers 107, 110, 112, two filters 109, 111, and a mixer circuit 108 which receives a low frequency from a second local oscillator synthesizer 117. The outputs of the last two amplifiers 110, 112 are extracted over line 113 in order to provide a signal proportional to the logarithm of the amplitudes of radio signals, as disclosed in the Dent patent.

As can be seen in FIG. 1, power is selectively removed from the fifth through tenth amplifiers and the second and third mixers 104 and 108 during a nap mode by control of the second power control bus 130.

Unlike the devices connected to the second power control bus 130 some components such as the frequency synthesizer 116 require longer periods to stabilize after activation. The frequency synthesizer 116 for example requires several milliseconds to achieve frequency lock. If the sleep duration is only of the order of a few milliseconds, the frequency synthesizer 116 cannot be deactivated and then reactivated within this brief duration. As the sleep duration increases, components such as the frequency synthesizer 116 may be deactivated thereby achieving a deep-sleep mode similar to that effected in radiopagers. In the deep-sleep mode, power may be removed from both the instant-on bus 130 and a fourth deep-sleep bus 160. A fifth power control bus 170 is likely to be always on since the reference oscillator 115 acts as the master clock and controls the sleep mode.

FIG. 2 illustrates how the circuit of FIG. 1 may be incorporated into a portable radiotelephone. In FIG. 2 is shown the RF front end 215 (shown in detail as 100 in FIG. 1) connected to an antenna 205 (shown as 101 in FIG. 1) and controlled by a microprocessor 230. The microprocessor 230 also controls a DSP (Digital Signal Processor) 210, a display 225, and a power control circuit 250. The microprocessor 230 is also connected to a RAM 220 for storage of data. All of these circuits receive power from a battery 245. Also included in the circuit shown is a programmable divider 235 is used to reduce the clock speed of a low power clock 240 before it is applied to the microprocessor 230 as a reference signal. This allows the processing rate to be reduced thereby reducing the current drain from battery 245. Of course, other techniques for reducing the processing rate of a microprocessor are known. The power control circuit 250 selectively deactivates various circuits depending upon the operative sleep mode.

For example, the power control circuit 250 may selectively power down the DSP 210 via a fifth power bus 255 and the display (or part of the display) by a sixth power bus 265. Line 260 in FIG. 2 represents the collective power buses shown in FIG. 1 for simplicity of illustration. The microprocessor 230, the RAM 220, the programmable divider 235 and the low-power clock 240 are connected to the battery 245 without an intervening power control in this exemplary embodiment insofar as in either nap or deep sleep modes at least some of their functions would normally remain operative, albeit at reduced power consumption, clock rate, etc.

Signaling Protocol

Given this power control architecture, it is required to develop a signaling protocol to initiate battery savings. It is desirable for this protocol to be compatible with current signaling standards in order to efficiently implement the invention in current systems though virtually any signaling protocol could be adapted to incorporate the present invention.

Referring to FIG. 3 there is shown by way of example the data message format of the FOrward analog Control Channel (FOCC) as specified by, e.g., the EIA/TIA IS-54B standard for dual-mode cellular communication. Each FOCC consists of three discrete information streams called stream A, stream B, and the busy-idle stream (including dotting and word synchronization sequences). Messages to mobile stations with the LSB (Least Significant Bit) of their MIN (Mobile Identification Number) equal to '0' are sent on stream A, and those with the LSB of their MIN equal to '1' are sent on stream B. Under IS-54, the MIN is a 34-bit digital number representing the 10 digit directory telephone number assigned to the mobile station. The busy-idle stream indicates the status of the reverse control channel.

A 10-bit dotting sequence (e.g., 1010101010) and an 11-bit word synchronization sequence (e.g., 11100010010) are sent to permit mobile stations to achieve synchronization with the incoming data. After the dotting, word sync messages are transmitted as a series of words. Each word contains 40 bits, including parity bits, and is repeated five times; this is referred to as a word block. For a multi-word message, the second word block and subsequent word blocks are formed as the first word block including the 10-bit dotting sequence and 11-bit word sync sequence. A word is formed by encoding 28 content bits into a (40,28) BCH (Bose-Chaudhuri-Hocquenghem) code that has a distance of 5. The left-most bit is designated the most significant bit.

Each FOCC message can consist of one or more words. The types of messages to be transmitted over the forward control channel include control messages, overhead messages and control-filler messages. Control-filler messages may be inserted between messages and between word blocks of a multi-word message.

In the class of overhead messages there exists an ability for local control messages. Via local control messages, a cellular system may customize operation for home mobile stations (mobile stations normally registered with a particular base station), and for those roaming stations whose home systems are members of a group of base stations. Local control orders are sent over the FOCC with the order field set to local control (which informs the mobile station to examine the local control field) and by sending one or both of two local control global action overhead messages. A group of systems could be formed by participating systems agreeing to a common set of local protocols and whose system identification (SID) are recognized by mobile stations as a common group.

Each global action overhead message consists of one word. Any number of global action message types can be appended to a system parameter overhead message.

According to the present invention, a paging message of varying length is appended to the local control message.

FIG. 4 illustrates the local control message format that may be sent over the FOCC according to the IS-54 standard. Within the local control message there are 16 bits available for the actual message. According to the present invention, two of these 16 bits are used as a update index indicating whether or not there has been any change to the message field following the overhead message. Six of the 16 bits are proposed to indicate the length of the message field. The remaining eight bits are reserved for future use such as a group identification number.

The other information elements shown in the local control message of FIG. 4 are: $T_1T_2$=Type Field. Set to '11' indicates an overhead word; DCC=Digital Color Code; ACT= Global Action Field—set to 1110 or 1111 indicates a local control message; END=End indication field—set to '1' indicates the last word of the overhead message; OHD= Overhead Message Type—set to '100' indicates global action message; and PARITY=12 Bit BCH parity field. Except for the structure of the local control element, the local control message shown in this exemplary embodiment are in accordance with the IS-54 standard.

Figure 5:
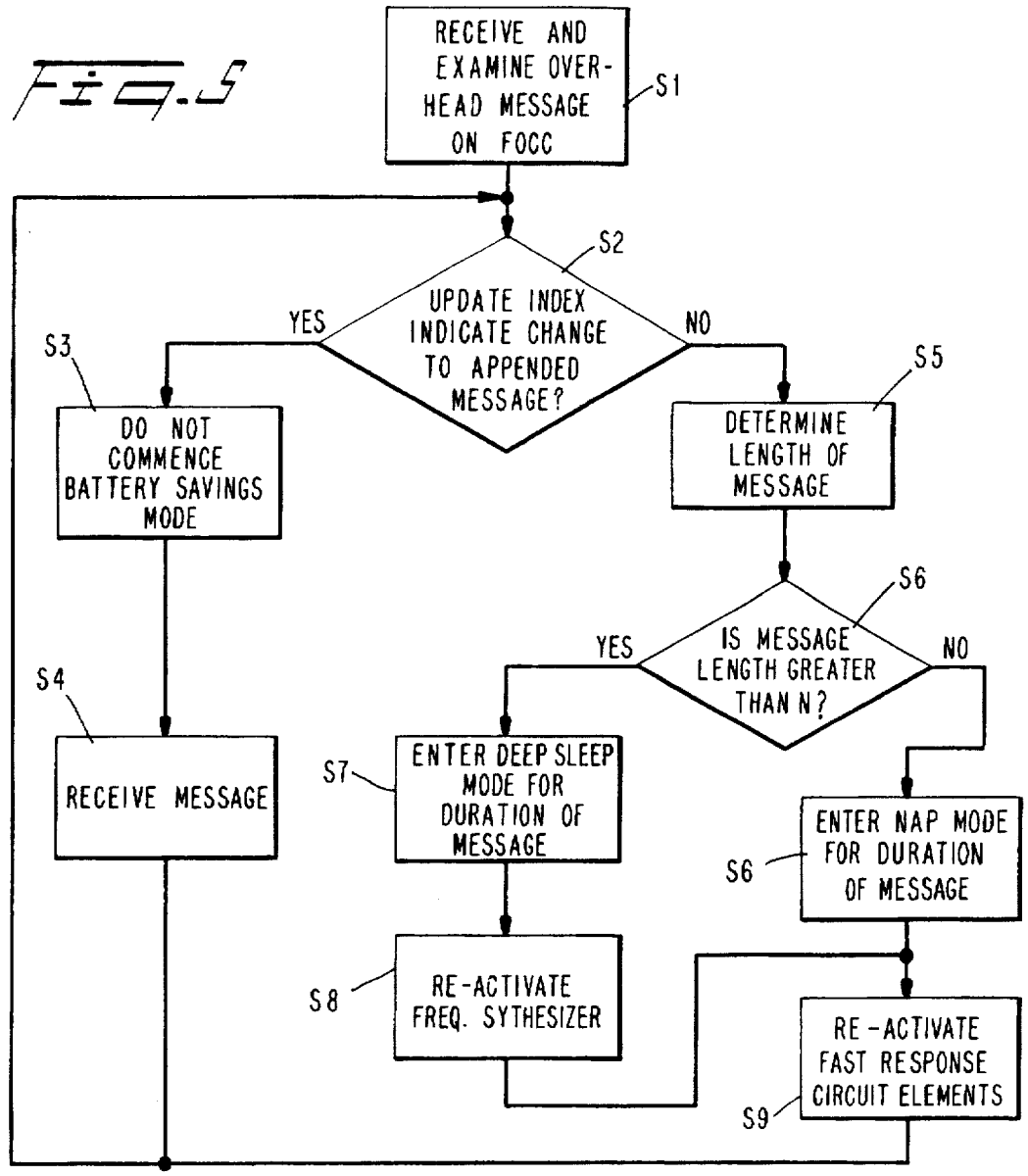
FIG. 5 is a flowchart showing the operation of an embodiment of the present invention.

The operation of the present invention may be explained by following the flowchart of FIG. 5. Assuming that all receiver circuits are activated, the portable radiotelephone receives and overhead message according to FIG. 4 over the FOCC as indicated at step S1. Following normal procedures, the message is identified as a local control message and the local control data field is examined. If there has been no previous receipt of the message, the update index is ignored. The frame index, indicating the number of words in the message, is read into memory and the mobile station examines the subsequent words for pages by a well known procedure. The phone the awaits receipt of a new message over the FOCC. This time upon receipt of a new local control message as described above the radiotelephone will examine the update index to see if there has been any change to the message since it was last received as indicated at step S2. If there has been a change to the data the radiotelephone will examine all or some of the words for paging information as shown at steps S3 and S4 as also described above without commencing a battery savings mode. Alteratively, techniques such as disclosed in U.S. Pat. No. 5,224,152 to L. Harte or U.S. application Ser. No. 08/059,932 to L. Harte et al. could be used.

If, however, the update index indicates at step S2 that there has been no change to the message, the radiotelephone enters one of two sleep modes. For the sake of example, it is assumed that at least four frames are required for the synthesizer to be efficiently turned off and back on. Naturally, other periods of time N may be appropriate for a given system. If the message length is less than or equal to four frames long as determined at step S5 the radiotelephone may enter a so-called nap mode as shown at step S6 where only the aforementioned instant-on circuits are deactivated for the duration of the message.

If the message length is greater than four frames, the radiotelephone may enter the so-called deep-sleep mode as shown at step S7 where even the slow response circuits are deactivated (by way of the third bus 160 of FIG. 1) and the processor speed is reduced (by way of power control 250 in FIG. 2), as indicated at step S7. The deep-sleep mode offers the greatest improvement in battery life. During this deep-sleep mode, preset conditions such as the FOCC frequency, message length, update index, and other information may be temporarily stored in non-volatile RAM to allow reactivation of the slow response circuits.

At some time before the next message is scheduled to arrive the channel synthesizer 116 must be reactivated (as shown at step S8) in order to give it sufficient time to achieve frequency lock (via power bus 130). This may precede activation of the instant-on circuits by a few milliseconds as shown at step S9.

As paging activity increases, the overhead message is updated more frequently. As a result it may be advantageous to reduce the message length as paging activity increases.

What the invention involves is a global action message that may essentially be a dummy message with no pages broadcast over several words. Normally, most pagers "wake-up" each frame to read the first repeat. If (in the case of the Harte patent) the MIN comparison fails the cell phone enters sleep mode. But if there are no pages to be sent the cell phone need not wake up each frame to see if there is a page waiting. If, for example, the paging load is such that there need only be one page every 5 frames then the cell phone can wake up once and look at the first repeat (assuming it successfully receives the first repeat) and then snooze for the next 4 frames. Since the period is long, the deep sleep mode can be used. This is similar to the DCC method of assigning paging frames under the IS-136 standard, but in this case the phone checks to see if the message changes by examining the bit field. In the DCC, the phone is assigned a paging frame. Other differences exist as well. When the paging activity increases, the length of the dummy message needs to be shortened to permit more frequent updates of the message.

Another novel feature of the present invention is the ability to dynamically allocate sleep periods according to paging activity. During evening hours when paging activity is lowest, the radiotelephone can spend a great deal of time in a deep-sleep mode thereby maximizing battery life. As paging activity picks up the radiotelephone will more often listen for pages thereby reducing the possibility of missed pages at the expense of increased battery usage.

The present invention has been described by way of example. The specific embodiments disclosed herein are not to be considered limitive and the scope of patent protection claimed herein is to be determined by the appended claims and equivalents of the recitations therein.

I claim:

1. A power control circuit structure comprising:
   a first group of circuit devices having a short initiation response time;
   a second group of circuit devices having long initiation response time relative to said initiation response time of said first group; and
   a power control circuit, operatively connected to said first and second groups of circuit devices, for selectively deactivating any one of the following: said first group of circuit devices, said second group of circuit devices and both said first and said second groups of circuit devices according to an expected duration of a standby mode.

2. A power control circuit structure according to claim 1, wherein said first group of circuit devices includes amplifiers and said second group of circuit devices includes a frequency synthesizer in a battery operated radio communications unit.

3. A power control circuit structure according to claim 1, further comprising a first power bus for operatively connecting said power control circuit to said first group of circuit devices and a second power bus for operatively connecting said power control circuit to said second group of circuit devices, wherein said power control selectively deactivates said first, second or both first and second groups of circuit devices by selectively removing power from said first and second power buses.

4. A power control circuit structure according to claim 1, further comprising a receiver for receiving messages including messages informing said power control circuit as to whether at least one of said first and said second groups of circuit devices can be deactivated.

5. A method of controlling power consumption, comprising the steps of:
   receiving a message which includes an indication of a period of time before a next relevant message is to be expected;
   determining whether said period of time is greater than or less than a given value;
   turning off a first group of circuit devices if said period of time is less than said given value, said first group of circuit devices having a combined deactivation and reactivation time less than said period of time; and
   turning off at least said second group of circuit devices if said period of time is greater than said given value, said second group of circuit devices having a combined deactivation and reactivation time greater than said period of time.

6. A method in accordance with claim 5, wherein both said first group and said second group of circuit devices are turned off when said period of time is greater than said given value.

7. A method in accordance with claim 5, wherein said period of time is indicated by determining whether the message was previously received, and, if it was, whether it is unchanged, and if it is unchanged, said period of time is determined by the length of the previously received, unchanged message.

8. A method in accordance with claim 5, wherein said period of time is equal to a previously received, unchanged message.

9. A method in accordance with claim 5, comprising the further step of reactivating said first and second groups of circuit devices prior to the lapse of said period of time.

10. A method in accordance with claim 9, wherein said second group of circuit devices is activated prior to said first group of circuit devices.

11. A method in accordance with claim 5, further comprising the step of storing preset conditions are stored in memory to allow reactivation of circuit devices.

12. A method in accordance with claim 11, wherein said preset conditions including forward control channel frequency, message length and update index information are stored in random access memory.

13. A method in accordance with claim 11, wherein said step of storing preset conditions are stored in non-volatile memory if said period of time is greater than said given value to allow reactivation of said second group of circuit devices.

* * * * *